(12) United States Patent
Mizoguchi

(10) Patent No.: US 7,335,849 B2
(45) Date of Patent: Feb. 26, 2008

(54) STUD WELDING METHOD

(75) Inventor: Junichi Mizoguchi, c/o Asia Giken Co., Ltd., 2-3-26, Suehiro, Kokurakita-ku, Kitakyushu-shi, Fukuoka (JP) 802-0012

(73) Assignee: Junichi Mizoguchi, Kitakyushu (JP)

( * ) Notice: Subject to any disclaimer, the term of this patent is extended or adjusted under 35 U.S.C. 154(b) by 0 days.

(21) Appl. No.: 11/439,118

(22) Filed: May 24, 2006

(65) Prior Publication Data

US 2007/0007255 A1    Jan. 11, 2007

(30) Foreign Application Priority Data

Jul. 5, 2005    (JP)    ............... 2005-196515

(51) Int. Cl.
*B23K 9/20*    (2006.01)
(52) U.S. Cl. .................. 219/99; 219/137 WM
(58) Field of Classification Search .............. 219/98, 219/99, 137 WM
See application file for complete search history.

(56) References Cited

FOREIGN PATENT DOCUMENTS

| EP | 1207000 A2 * | 5/2002 |
|---|---|---|
| JP | 11-90637 | 4/1999 |
| JP | 2000-79480 | 3/2000 |
| JP | 2002-172465 | 6/2002 |
| JP | 2002-172466 | 6/2002 |
| JP | 2002-172467 | 6/2002 |

OTHER PUBLICATIONS

T. Lyman, editor, Metals Handbook, 8th edition, vol. 6, "Welding and Brazing", 1971, p. 175.*
"CD Stud Welding Systems" Asia Giken Co. Ltd., 1997.

* cited by examiner

*Primary Examiner*—Clifford C. Shaw
(74) *Attorney, Agent, or Firm*—Westerman, Hattori, Daniels & Adrian, LLP.

(57) ABSTRACT

A method of welding a stud 15 to a base material 14, both made of magnesium or magnesium alloy, comprising; a first step of disposing the stud 15 having a projection 28 at an end portion thereof to have a gap to the base material 14; a second step of lowering the stud 15 rapidly; and a third step of welding the end portion of the stud 15 to the base material 14 by discharging an electric charge stored in a capacitor 11 between the base material 14 and the stud 15, each having an oxide layer destroyed by the rapid lowering of the stud 15, wherein the discharge of the capacitor 11 is carried out by applying a pulse signal having a duration of more than 0.1 seconds to a gate of a thyristor 13 as a signal to start welding, the thyristor 13 serving as a discharge switch of the capacitor 11.

8 Claims, 3 Drawing Sheets

(A)

(B)

(C)

STUD WELDING METHOD

BACKGROUND OF THE INVENTION

1. Field of the Invention

The present invention relates to a method of welding a stud made of magnesium or magnesium alloy to a base material made of magnesium or magnesium alloy.

2. Description of the Related Art

Material made of magnesium or magnesium alloy is extremely difficult to weld since a tough oxide layer forms on a surface thereof and the material oxidizes easily. For example, Japanese Published Patent Application No. 2002-172465 discloses a method of welding a stud on a base material. In accordance with the method, a large-capacity capacitor stores an electric charge, and the electric charge of the capacitor is rapidly discharged in a state that the stud having a projection at an end thereof is in contact with the base material. Thereby, an arc is instantaneously generated between the end of the stud and the base material, and consequently the end of the stud is welded to the base material.

However, it is difficult to weld a stud made of magnesium or magnesium alloy (hereinafter simply referred to as a stud) to a base material made of magnesium or magnesium alloy (hereinafter simply referred to as a base material) by adopting the above-mentioned stud welding method as it is originally. Therefore, it is extremely difficult to demand substantially effective joining strength of the stud according to its shape and material.

SUMMARY OF THE INVENTION

The present invention has been made in view of the disadvantages of the prior art, and thus it is an object of the present invention to provide a stud welding method wherein the stud and the base material made of magnesium or magnesium alloy are welded to each other with sufficient joining strength.

A first aspect of the present invention for attaining the above object provides a method of welding a stud made of magnesium or magnesium alloy to a base material made of magnesium or magnesium alloy, comprising: a first step of disposing the stud so as to have a gap in a range of 0.5 to 12 mm between the stud and the base material, the stud having a projection at an end portion thereof; a second step of rapidly lowering the stud; and a third step of rapidly discharging an electric charge stored in a capacitor between the base material and the stud, each having an oxide layer destroyed by the rapid lowering of the stud, to form a non-oxidative atmosphere at an area being welded and to isolate the area from the atmospheric air, thereby welding the end portion of the stud to the base material; wherein the discharge of the capacitor is carried out by supplying a pulse signal having a duration of more than 0.1 seconds (preferably 0.5 to 2 seconds) to a gate of a thyristor as a signal to start welding, the thyristor serving as a discharge switch of the capacitor.

In the method of welding a stud, the electric charge is discharged between the base material and the stud after the stud is quickly moved downward to break the oxide layers, thereby producing the non-oxidative atmosphere (in particular, atmosphere filled with metal arc). Since welding is carried out in this way, the area being welded is isolated from the atmospheric air, whereby a cleaner welding area is obtained. The gap between the base material and the stud of less than 0.5 mm would not allow the stud to accelerate sufficiently until right before contacting the base material; therefore, impact of the stud colliding with the base material becomes insufficient. The gap larger than 12 mm is too long to downsize the apparatus. Another disadvantage of the larger gap is that collision force between the stud and the base material is likely to vary.

The pulse signal longer than 0.1 seconds which serves as a switch signal for discharge of the capacitor is applied to the gate to energize the thyristor. As a result, the capacitor is reliably discharged.

A second aspect of the present invention provides a method of welding a stud in accordance with the first aspect of the present invention, wherein the lowering of the stud in the second step is carried out by elevating a lifting and lowering member carrying the stud and pressed downward by a spring against the force of the spring, retaining the elevated lifting and lowering member by an electromagnet, and subsequently turning off the current of the electromagnet to rapidly lower the lifting and lowering member. Accordingly when the power source of the electromagnet is turned off, the lifting and lowering member pressed by the spring lowers. Consequently, a simple structured apparatus is obtained.

A third aspect of the present invention provides a method of welding a stud in accordance with the first aspect of the present invention, wherein the lowering of the stud in the second step is carried out by lowering a lifting and lowering member carrying the stud by a linear motor. Use of the linear motor allows lowering speed etc. of the stud to be regulated finely, thereby enabling appropriate regulation of welding time and pressing force according to a shape and material of the stud.

A fourth aspect of the present invention provides a method of welding a stud in accordance with the first to the third aspects of the present invention, wherein the projection of the stud has a diameter in a range of 1/12 to 1/8 (preferably 1/10 to 1/9) of a diameter of a welding portion of the stud. In case of employing a stud having a flange at a lower end thereof, the diameter of the welding portion of the stud is equal to a diameter of the flange. And in case of employing a stud without a flange, the diameter of the welding portion of the stud is equal to a diameter of the stud. Since the projection having a larger diameter requires greater energy for welding, heat input becomes excessive, and thereby the stud having the larger diameter projection cannot be welded to a thin plate. On the other hand, the projection having a smaller diameter increases resistance, thereby enhancing an overall heat input. However, the projection is crushed or destroyed when the stud lowers, which unfavorably results in variation of welding strength.

A fifth aspect of the present invention provides a method of welding a stud in accordance with the first to the fourth aspects of the present invention, wherein the end portion of the stud including the projection is formed by a header processing after heating a stud material to a range of 250 to 400° C. (preferably 250 to 300° C.) in an inert gas or in vacuum. Thereby, plastic processing of the stud is carried out.

A sixth aspect of the present invention provides a method of welding a stud in accordance with the first to the fifth aspects of the present invention, wherein if a welding area of the base material is a smooth curved surface, a lower end surface of the stud excluding the projection is formed to fit in the welding area of the base material, e.g., with a clearance of 1 to 3 mm therebetween. Thus, the welding area of the stud is fitted in the base material well, and welding strength increases. In the above aspects of the present invention, "lower" and "lowering" mean to move the stud in a direction closer to (or to make the stud collide with) the base material.

In the first to the sixth aspects of the present invention, the electric discharge is started while the stud disposed to have a gap of 0.5 to 12 mm between the stud and the base material is rapidly lowered, thereby destroying the oxide layers formed on the surfaces of the base material and the stud. With the oxide layers of both the base material and the stud destroyed, the pulse signal is applied to the gate of the thyristor to discharge the electric charge in the capacitor assuredly. Thus, an arc is generated, and the non-oxidative atmosphere is produced in the circumference of the area being welded. As a result, the stud and the base material made of magnesium or magnesium alloy are welded, which has been conventionally difficult. Another advantage of the present invention is that the welded area formed between the base material and the stud has a relatively low oxide and a better welding strength.

DETAILED DESCRIPTION OF THE INVENTION

Referring now to the accompanying drawings, an embodiment of the present invention is described for a more complete understanding of the present invention.

Figure 1:
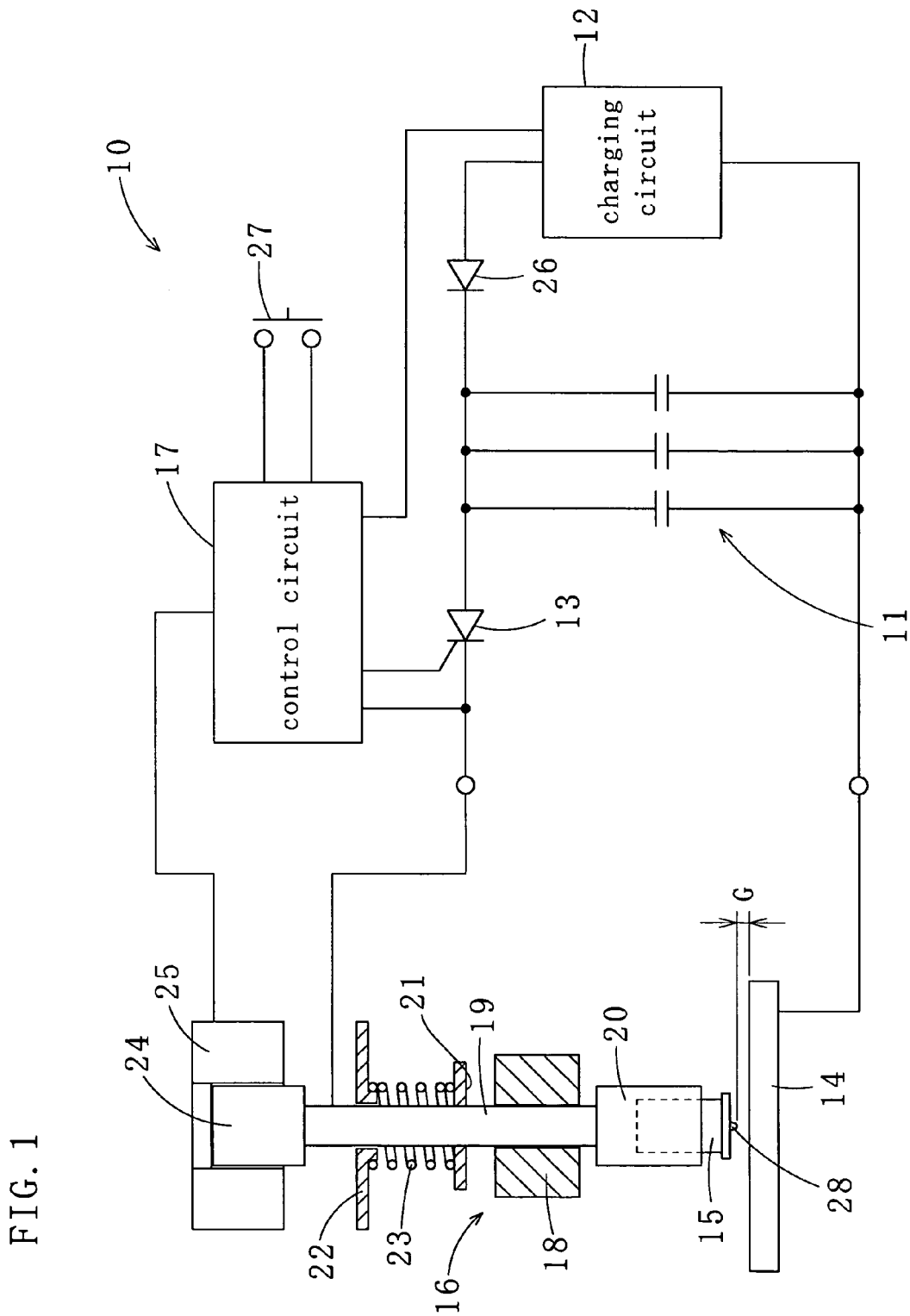
FIG. 1 is a descriptive illustration of a method of welding a stud in accordance with one embodiment of the present invention.

As shown in FIG. 1, a stud welding apparatus 10 used to implement a method of welding a stud in accordance with one embodiment of the present invention includes a large-capacity capacitor 11 formed by a plurality of capacitor units connected in parallel, a charging circuit 12 for charging the capacitor 11 with an electrical charge from a commercial power source, a thyristor 13 serving as a switch to start discharge of the capacitor 11, a stud-welding jig 16 for retaining a stud 15 made of magnesium or magnesium alloy disposed over a base material 14 made of magnesium or magnesium alloy and for pressing the stud 15 against the base material 14 at a predetermined impact pressure, and a control circuit 17 for regulating the above components. These components are described in details hereinafter.

The stud-welding jig 16 includes a rod 19 made of a conductor and a holder 20 disposed at a lower end of the rod 19. The rod 19 is an example of a lifting and lowering member that is vertically movable along a guide member 18. The holder 20 is operable to retain the stud 15. A spring receiving seat 21 is provided in a middle portion of the rod 19, and pressed downward by a compression spring 23 (an example of springs) disposed between the spring receiving seat 21 and a spring supporting fixed plate 22. A magnetic matter 24 (e.g., iron or a permanent magnet) and an electromagnet 25 through which the magnetic matter 24 penetrates are positioned at an upper end of the rod 19. When the electromagnet 25 is energized, the rod 19 provided with the magnetic matter 24 elevates against the compression spring 23. However, when the energization of the electromagnet 25 is stopped, the stud 15 fitted in the holder 20 provided on the rod 19, i.e., at the distal portion of the rod 19 is designed to collide with the base material 14 by biasing force of the compression spring 23. The guide member 18, the spring supporting fixed plate 22, and the electromagnet 25 are fixed to a main body of a welding gun by respective support members not shown.

The charging circuit 12 is connected to the capacitor 11 via a diode 26 that prevents reverse current flow. The charging circuit 12 operates by detecting that the discharge of the capacitor 11 is completed and the thyristor 13 is turned off, and charges the capacitor 11 to a certain voltage. A cathode (an output) of the thyristor 13 is connected directly to the conductive rod 19 by a flexible conductor without via a reactor etc. This configuration allows quick discharge of the electric charge stored in the capacitor 11. Consequently, a non-oxidative (i.e., reducing) atmosphere comprising volatilized metal constituents is produced at a welding start point where the stud and the base material are in contact during the initial discharge time, thereby preventing rapid oxidation of magnesium. In this manner, welding of the stud and the base material is completed. The control circuit 17 continuously supplies current to the electromagnet 25 to attract the magnetic matter 24, thereby keeping the stud 15 lifted.

The control circuit 17 is provided with a welding start switch 27. Activation of the welding start switch 27 turns off the energization of the electromagnet 25 and simultaneously supplies a pulse current (pulse signal) to the gate of the thyristor 13. The pulse current has a relatively long energization time (more than 0.1 seconds and equal to or less than 2 seconds). After the stud 15 moves downward, a projection 28 provided at an end of the stud 15 is brought into contact with the base material 14, and the capacitor 11 discharges the electric charge. A gap G between the projection 28 of the stud 15 and a surface of the base material 14 can constantly be regulated to any distance in a range of 0.5 to 12 mm. Namely, the gap G is adjustable by controlling a mechanism (not shown) for adjusting a vertical position of the electromagnet 25 provided above the stud-welding jig 16.

Figure 2:
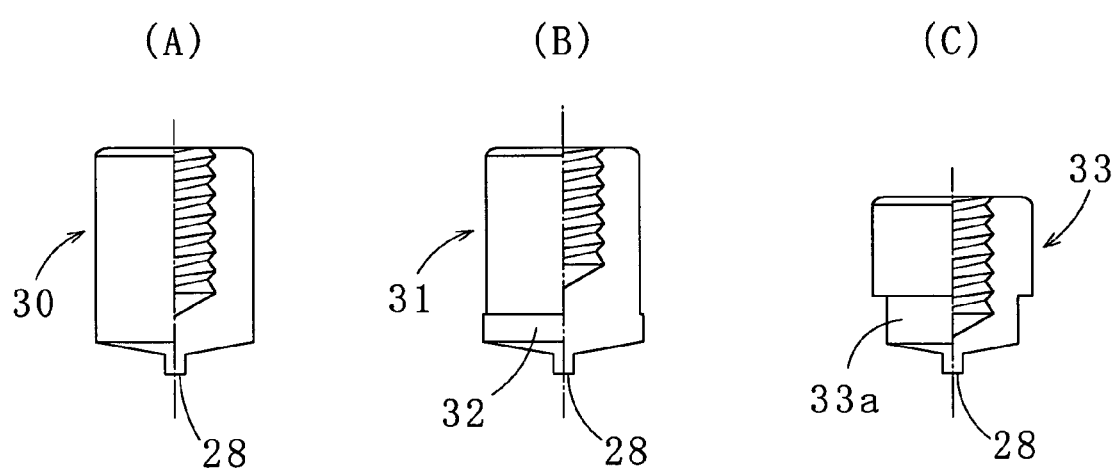
FIGS. 2(A), 2(B) and 2(C) are partly cut-away side views of studs used in the method in accordance with the embodiment.
Figure 3:
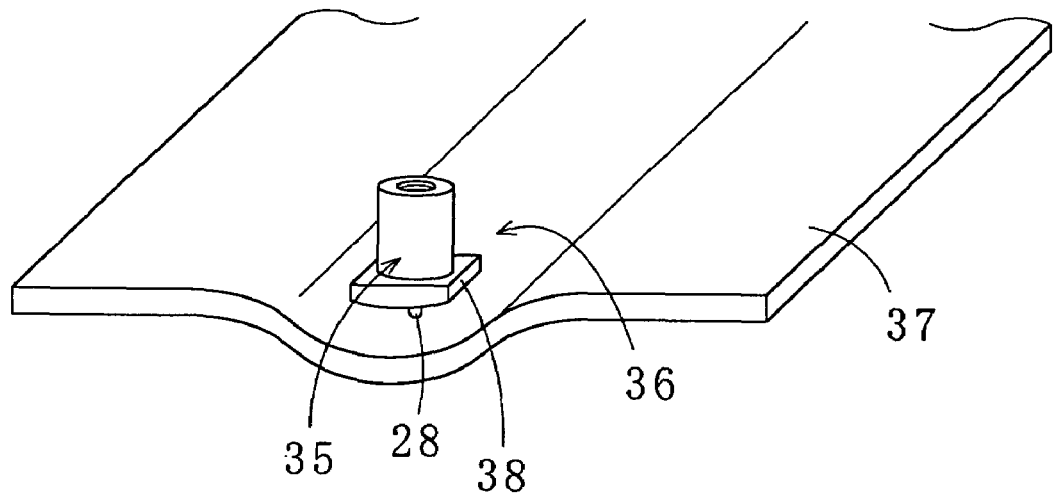
FIG. 3(A) is a descriptive illustration of another stud used in the method in accordance with the embodiment.
FIGS. 3(B) and 3(C) are a front view and a side view of the stud, respectively.
Figure 3:
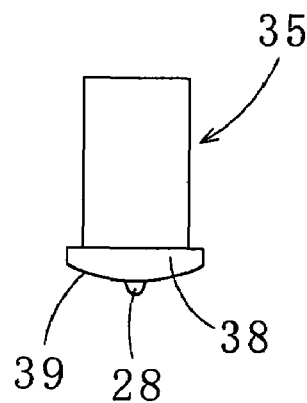
Figure 3:
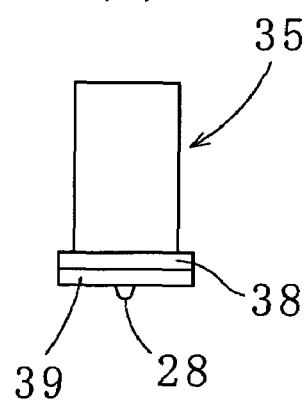

FIGS. 2(A) to 2(C) illustrate other examples of the stud employed in the stud welding method of the present invention. A stud 30 shown in FIG. 2(A) is a straight type, and a stud 31 shown in FIG. 2(B) has a flange 32 disposed in a lower portion thereof. A stud 33 illustrated in FIG. 2(C) has a lower portion reduced in diameter and the projection 28 provided in a lower end of the diameter reduced lower portion. Furthermore, there is a uniquely shaped stud 35 as shown in FIGS. 3(A) to 3(C). In welding the stud 35 to a shallow curved groove 36 provided in a base material 37 as shown in FIG. 3(A), for example, a bottom surface (a lower end surface) 39 of a flange 38 disposed in a lower portion of the stud 35 is formed to fit in a smooth curved surface formed in the groove 36 as shown in FIGS. 3(B) and 3(C), thereby allowing the stud 35 to be welded to the base material 37 more uniformly with a greater strength.

Each of the studs 15, 30, 31, 33 and 35 is provided with the projection 28 having a diameter preferably in a range of $\frac{1}{12}$ to $\frac{1}{8}$ (more preferably $\frac{1}{10}$ to $\frac{1}{9}$) of a diameter of a welding portion in the each of the studs. In the stud 31 provided with the flange 32, the diameter of the welding portion denotes a diameter of the flange 32. In the stepped stud 33, the diameter of the welding portion denotes a diameter of a step 33a. In the straight type stud 30, the diameter of the welding portion denotes a diameter of the stud. Smaller diameters of the projection 28 would cause the projection 28 to crush when the stud is lowered to collide with the base material 14 or the like. Meanwhile, larger diameters of the projection 28 would result in shortage of welding current. Even if sufficient welding current is supplied, excessive heat input is fed to the area being welded, thereby causing a problem such as occurrence of a distortion in the welded area. An end of the stud including the projection 28 is desirably formed from a stud material made of magnesium alloy (or magnesium) by header work (press work, i.e., plastic processing) after heating the stud material to a range of about 250 to 400° C. in an inert gas or in vacuum since it is difficult to process the stud material at normal temperatures.

Referring now to FIG. 1, the stud-welding method in accordance with the embodiment of the present invention is described. The stud 15 having the projection 28 at the end portion thereof is attached to the holder 20 and is positioned to have a gap in a range of 0.5 to 12 mm (e.g., 3 mm) between the projection 28 and the base material 14. In this state, the electromagnet 25 is energized, the rod 19 is elevated, and the capacitor 11 has been charged to a predetermined voltage. Pressing the welding start switch 27 in this state serves as a welding start signal and releases excitation of the electromagnet 25, with the result that the pulse current is applied to the gate of the thyristor 13. When energization of the electromagnetic 25 is turned off, the stud 15 is pressed by the compression spring 23 to move downward rapidly and collide with the base material 14, whereby oxide layers formed on the projection 28 of the stud 15 and the base material 14 are instantaneously destroyed. Subsequently, the capacitor 11 starts to discharge. A discharge circuit of the capacitor 11 is not provided with a reactor etc. which is a device to moderate rapid discharge of the capacitor 11. Thus, the electric charge stored in the capacitor 11 is quickly discharged in an extremely short period of time, and welding is completed without forming additional oxide layers. In this case, the pulse current applied to the gate of the thyristor 13, which serves as the starting signal for welding, has a sufficient duration, i.e., 0.1 seconds or more. Accordingly, the current is continuously applied to the gate even after the projection 28 and the base material 14 come in complete contact with each other, and discharge of the capacitor 11 is carried out after energization of the thyristor 13 is assured. As a result, problems such as defective welding do not occur.

In the above embodiment, lowering and lifting of the rod 19 is carried out by the electromagnet 25 and the compression spring 23. Alternatively, a linear motor may be employed to regulate the rod (a lifting and lowering member). In the alternative, more accurate control of the rod is possible, thereby obtaining a higher quality welding section. Furthermore in the alternative, current needs to be continuously applied to the gate of the thyristor 13 until the rod 19 starts lowering and the projection 28 of the stud 15 assuredly comes in contact with the base material 14 as in the same way as the embodiment.

What is claimed is:

1. A method of welding a stud made of magnesium or magnesium alloy to a base material made of magnesium or magnesium alloy, comprising:

a first step of disposing the stud so as to have a gap in a range of 0.5 to 12 mm between the stud and the base material, the stud having a projection at an end portion thereof;

a second step of rapidly lowering the stud; and a third step of rapidly discharging an electric charge stored in a capacitor between the base material and the stud without providing a device to moderate rapid discharge of the capacitor, each having an oxide layer destroyed by the rapid lowering of the stud, forming a non-oxidative atmosphere at an area being welded which isolates the area from the atmospheric air, thereby welding the end portion of the stud to the base material;

wherein the discharge of the capacitor is carried out by supplying a pulse signal having a duration of more than 0.1 and equal to or less than 2 seconds to a gate of a thyristor as a signal to start welding, the thyristor serving as a discharge switch of the capacitor.

2. The method of welding a stud according to claim 1, wherein the lowering of the stud in the second step is carried out by elevating a lifting and lowering member carrying the stud and pressed downward by a spring against the force of the spring, retaining the elevated lifting and lowering member by an electromagnet, and subsequently turning off the current of the electromagnet to rapidly lower the lifting and lowering member.

3. The method of welding a stud according to claim 2, wherein the projection of the stud has a diameter in a range of $\frac{1}{12}$ to $\frac{1}{8}$ of a diameter of a welding portion of the stud.

4. The method of welding a stud according to claim 2, further comprising header processing wherein the end portion of the stud including the projection is formed after heating a stud material to a range of 250 to 400° C. in an inert gas or in vacuum.

5. The method of welding a stud according to claim 1, wherein the lowering of the stud in the second step is carried out by lowering a lifting and lowering member carrying the study by a linear motor.

6. The method of welding a stud according to claim 5, wherein the projection of the stud has a diameter in a range of $\frac{1}{12}$ to $\frac{1}{8}$ of a diameter of a welding portion of the stud.

7. The method of welding a stud according to claim 5, further comprising header processing wherein the end portion of the stud including the projection is formed after heating a stud material to a range of 250 to 400° C. in an inert gas or in vacuum.

8. The method of welding a stud according to claim 1, wherein the welding area of the base material is a smooth curved surface and a lower end surface of the stud excluding the projection is formed to fit in the welding area of the base material.

* * * * *